United States Patent [19]

Niino et al.

[11] Patent Number: 5,140,863
[45] Date of Patent: Aug. 25, 1992

[54] SCREW-NUT FEED MECHANISM

[75] Inventors: Yasuo Niino, Aichi; Tetsuo Shibukawa, Nagoya; Shinji Murakami, Chiryu, all of Japan

[73] Assignee: Toyoda Koki Kabushiki Kaisha, Kariya, Japan

[21] Appl. No.: 631,945

[22] Filed: Dec. 21, 1990

[30] Foreign Application Priority Data

Dec. 25, 1989 [JP] Japan .................. 1-147737

[51] Int. Cl.$^5$ ............................................ F16H 27/02
[52] U.S. Cl. ........................... 74/89.15; 74/424.8 R
[58] Field of Search .................... 74/89.15, 424.8 R

[56] References Cited

U.S. PATENT DOCUMENTS

| 3,337,732 | 8/1967 | Opocensky | 250/52 |
| 3,745,840 | 7/1973 | Guralnick | 74/89.15 |
| 4,787,260 | 11/1988 | Bailey | 74/89.15 |

FOREIGN PATENT DOCUMENTS

| 3623112 | 1/1987 | Fed. Rep. of Germany | 74/89.15 |
| 62-13861 | 1/1987 | Japan . | |
| 752078 | 7/1980 | U.S.S.R. | 74/424.8 R |

Primary Examiner—Allan D. Herrmann
Assistant Examiner—David W. Laub
Attorney, Agent, or Firm—Oblon, Spivak, McClelland, Maier & Neustadt

[57] ABSTRACT

A screw-nut feed mechanism for effecting displacement of a movable table on a guiding base or bed in accordance with rotation of a feed screw shaft mounted on the guiding base. Ther feed mechanism includes a ball nut assembly threadedly coupled with the feed screw shaft, and a floatably supporting member for floatably supporting the ball nut assembly. The floatably supporting member is composed of a board having a predetermined thickness in a direction parallel to the rotational axis of the feed screw shaft. The floatably supporting member is formed with plural slots penetrating the floatably supporting member in a direction parallel to the axis of the feed screw shaft so as to form a fixed portion, a first floating portion, first flexible connecting portions which support the first floating portion for movement relative to the fixed portion in a first direction perpendicular to the axis of the feed screw shaft, a second floating portion, and second flexible connecting portions which support the second floating portion for movement relative to the first floating portion in a second direction perpendicular to the axis of the feed screw shaft and the first axis. The ball nut assembly is secured to the second floating portion of the floatably supporting member.

3 Claims, 3 Drawing Sheets

SCREW-NUT FEED MECHANISM

BACKGROUND OF THE INVENTION

1. Field of the Invention

The present invention relates to a screw-nut feed mechanism for effecting displacement of a movable table on a guiding base or bed in accordance with rotation of a feed screw shaft mounted on the guiding base.

2. Discussion of the Prior Art

In a conventional screw-nut feed mechanism, a ball nut assembly, which is threadedly coupled with a feed screw shaft, is fixedly attached to a movable table. In such case, horizontal deviation of the movable table is caused by a bad straightness (or whirling due to the bad straightness) of the feed screw shaft, an error in centering of the shaft or the lie, resulting in deterioration of straightness in feed of the movable table.

For solution of such a problem, a screw-nut feed mechanism has been proposed in Japanese Patent Publication No. 62-13861, wherein a ball nut assembly is carried on a movable table to be floatable in a plane perpendicular to the rotational axis of a feed screw shaft. In use of such a floating ball nut assembly, it is required to reliably restrict rotation of the ball nut assembly caused by rotation of the feed screw shaft, and it is also required to reliably apply a thrust force of the ball nut assembly to the movable table. These facts will have a great influence on feed precision of the movable table.

The floating mechanism disclosed in the above-mentioned Japanese Patent publication No. 62-13861 is provided with a cylindrical floating body having one end portion secured to the movable table, another end portion secured to one end of the ball nut assembly, and a mid portion arranged between the end portions and connected with them through a pair of axially spaced flexible portions, each of the flexible portions being formed to permit movement of the mid portion in a plane perpendicular to the axis of the feed screw shaft and to restrict rotation of the ball nut assembly. The floating mechanism is also provided with a pair of parallel tie-rods arranged in parallel with the axis of the feed screw shaft to transmit a thrust force of the ball nut assembly to the movable table.

The floating mechanism, however, has a problem that a pair of tie-rods are required for transmission of thrust force, thereby resulting in increase of the complexity of the floating mechanism and increase of the axial length thereof. The floating mechanism has another problem that the position of the movable table may change due to thermal expansion of the tie-rods.

SUMMARY OF THE INVENTION

Accordingly, it is an object of the present invention to provide an improved screw-nut feed mechanism having a simple structure capable of absorbing whirling of the feed screw shaft and/or an error in centering the feed screw shaft.

According to the present invention, the primary objects is attained by providing a floatably supporting member which is composed of a board extending in a plane perpendicular to the rotational axis of the feed screw shaft and having a predetermined thickness in the rotational axis. The floatably supporting member is formed with plural slots penetrating the floatably supporting member in a direction parallel to the axis of said feed screw shaft so as to form a fixed portion, a first floating portion, first flexible connecting portions which support the first floating portion for movement relative to the fixed portion in a first direction perpendicular to the axis of the feed screw shaft, a second floating portion, and second flexible connecting portions which support the second floating portion for movement relative to the first floating portion in a second direction perpendicular to the axis of the feed screw shaft and the said first direction. The floatably supporting member is assembled in such a way that the fixed portion thereof is secured to a movable table, and a ball nut assembly which is threadedly coupled with a feed screw shaft is attached to the second floating portion of the floatably supporting member.

With this configuration, whirling of the feed screw shaft and an error in centering of the shaft or the like are absorbed by flexible connecting portions formed in the floatably supporting member. Since the flexible connecting portions have a predetermined thickness in a direction parallel to the rotational axis of the feed screw shaft, the floating mechanism has a sufficient stiffness required for transmitting thrust force of the ball nut assembly, thereby realizing a desired floating function without using tie rods and the like.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF THE PREFERRED EMBODIMENT

Figure 1:
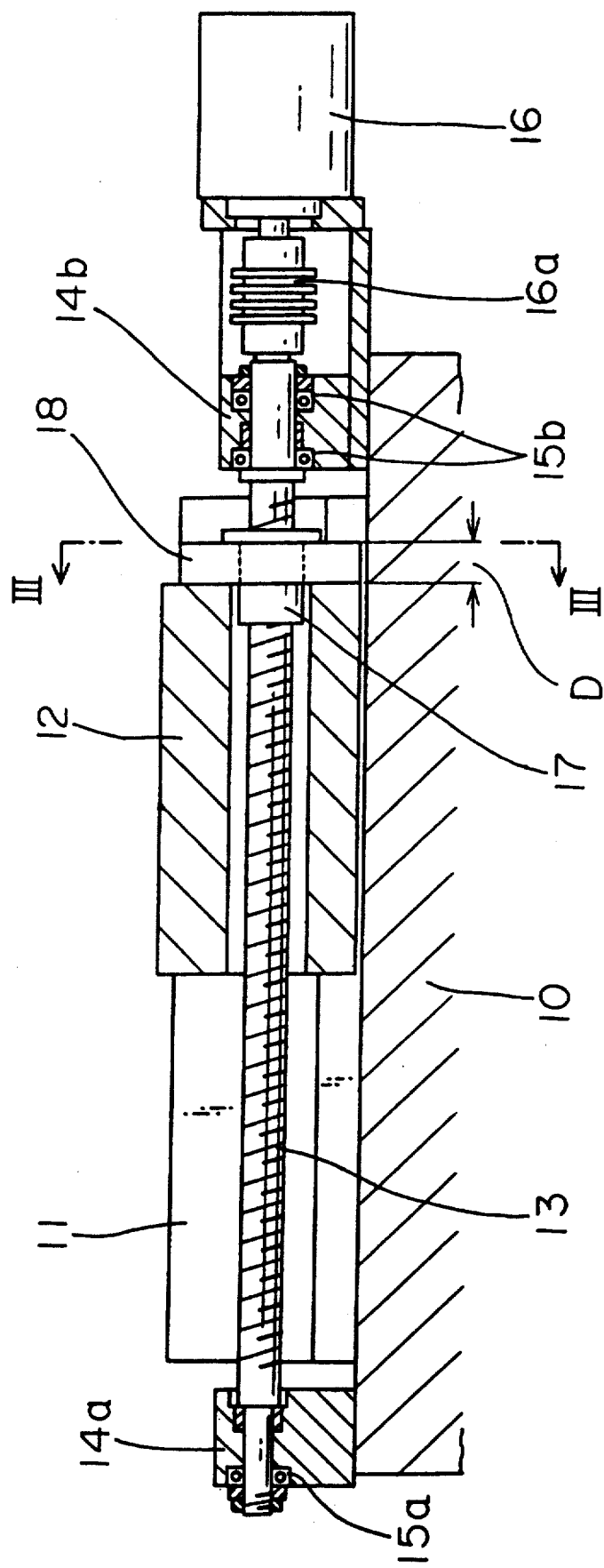
FIG. 1 is a cross sectional view of a screw-nut feed mechanism according to a first embodiment of the present invention.
Figure 2:
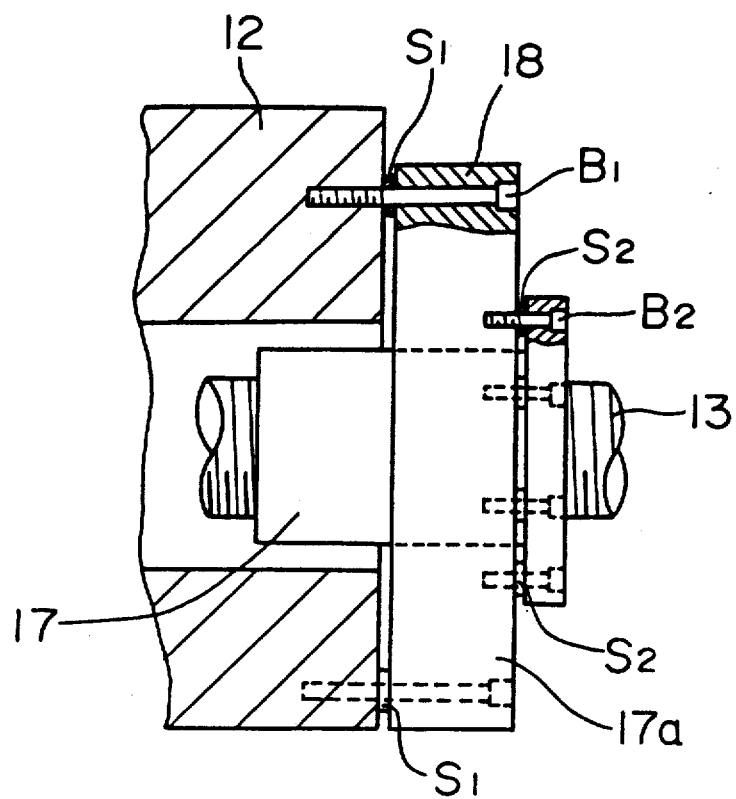
FIG. 2 is an enlarged side view of the floatably supporting member shown in FIG. 1.
Figure 3:
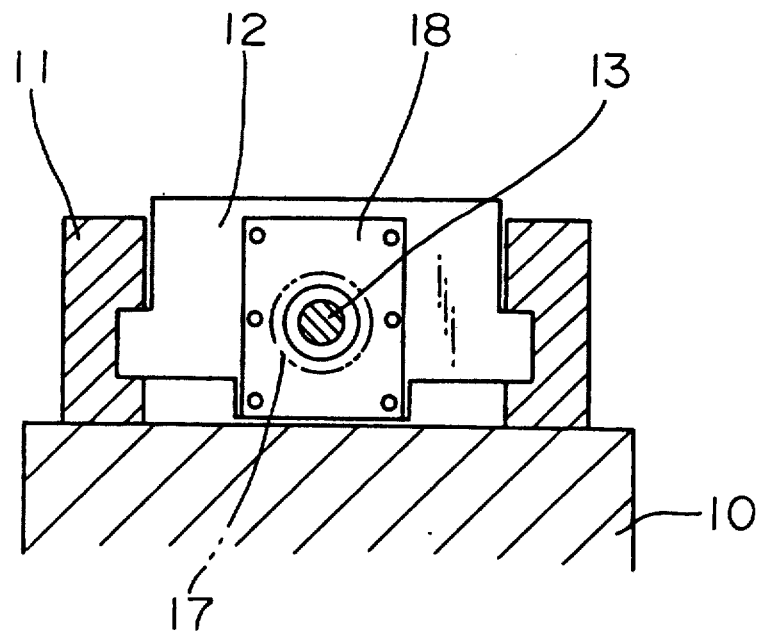
FIG. 3 is a cross sectional view taken along line III—III in FIG. 1.

Referring now to the drawings and particularly, to FIG. 1 through FIG. 3 thereof showing a first embodiment of the present invention, there is illustrated a guiding base or bed 10 on which guiding members 11 are mounted in parallel to each other to slidably support a movable table 12 thereby. A pair of bearing blocks 14a and 14b are also mounted on the bed 10 to rotatably support a feed screw shaft 13 through bearings 15a, 15b for rotation about an axis parallel with the sliding direction of the table 12. One end of the feed screw shaft 13 is connected to the output shaft of a servomotor 16 through a flexible coupling 16a.

A ball nut assembly 17 is threadedly coupled with the feed screw shaft 13 through balls (not shown) and is floatable carried on a floatably supporting member 18 which is secured to the end surface of the table 12. Hereinafter, the structure of the floatably supporting member 18 will be described in detail with reference to FIG. 4.

Figure 4:
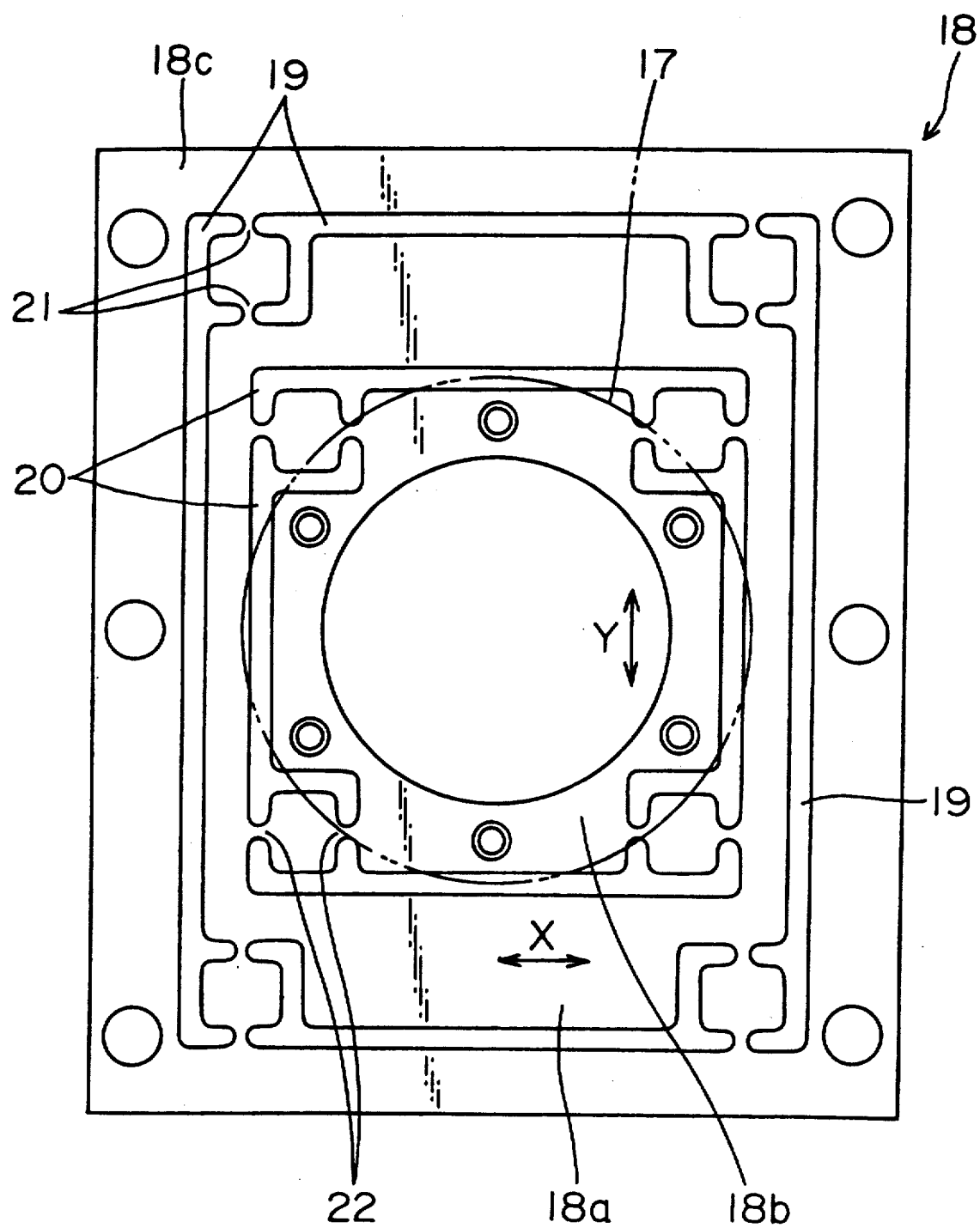
FIG. 4 is an enlarged front view of the floatably supporting member shown in FIG. 1.

The floatably supporting member 18 is composed of a rectangular board extending in a plane perpendicular to the axis of the feed screw shaft 13 and having a predetermined thickness in a direction parallel to the axis of the feed screw shaft 13. The floatably supporting member 18 is formed with four slots 19 penetrating the floatably supporting member 18 in the direction of thickness thereof. The slots 19 are parallel to the four side surfaces of the floatably supporting member 18, respectively, and each of the slots 19 is provided at its both end with a pair of extension portions so as to form a pair of hinge springs 21 between every two adjacent slots 19. As a result, a first floating portion 18a having a rectangular, framelike shape is formed within a flamelike fixed portion 18c of the floatably supporting member 18, and four pairs of hinge springs 21 are formed at respective corners of the first floating portion 18a so as to integrate and support the first floating portion 18a therethrough. The hinge springs 21 operates a first flexible connecting portions. Since each pair of hinge springs 21 are aligned in a vertical direction (direction Y), as shown in FIG. 4, the first floating portion 18a is allowed to move in a horizontal direction ( direction X) perpendicular to the direction Y. Further, four slots 20 penetrating the floatably supporting member 18 are formed within the first floating portion 18a. The slots 20 are also parallel to the four side surfaces of the floatably supporting member 18, respectively, and each of slots 20 is provided at its both end with a pair of extension portions so as to form a pair of hinge springs 22 between every two adjacent slots 20. As a result, a second floating portion 18b having a rectangular shape is formed within the first floating portion 18a, and four pairs of hinge springs 22 are formed at respective corners of the second floating portion 18b so as to integrate support the second floating portion 18b therethrough. The hinge springs 22 operates a second flexible connecting portions. Since each pair of hinge springs 22 are aligned in the direction X, as shown in FIG. 4, the second floating portion 18b is allowed to move in the direction Y. The slots 19 and 20 are formed using a wire-EDM (electric discharge machine).

The fixed portion 18c of the floatably supporting member 18 is secured to the end surface of the table 12 using bolts B1 and spacers S1, as shown in FIG. 2, so that a predetermined clearance is formed between the end surface of the table 12 and the floatably supporting member 18. Further, the flange portion 17a of the ball nut assembly is attached to the second floating portions 18b of the floatably supporting member 18 using bolts B2 and spacers S2 so that a predetermined clearance is formed between the floatably supporting member 18 and the flange portion 17a of the ball nut assembly 17.

Since each pair of hinge springs 21 and 22 operate in a way similar to that of a leaf spring, the second floatably supporting member 18b is prevented from rotating about the axis of the feed screw shaft 13, thereby preventing the ball nut assembly 17 from rotation. On the other hand, the hinge springs 21 and 22 allow the ball nut assembly 17 to move in the plane perpendicular to the axis of the feed screw shaft 13.

Since the ball nut assembly 17 threadedly coupled with the feed screw shaft 13 is secured to the second floating portion 18b of the floatably supporting member 18, whirling motion of the feed screw shaft 13 which occurs during rotation is absorbed by the hinge springs 21 and 22, thereby allowing thrust force generated by the ball nut assembly 17 to be transmitted to the table 12 without any bad influence caused by bad straightness of the feed screw shaft and an error in centering of the shaft or the like.

The stiffness of the floatably supporting member 18 in the axial direction of the feed screw shaft 13 has a great influence in the above-explained thrust force transmission. Since the hinge springs 21 and 22 extend in the direction of thickness of the floatably supporting member 18, the stiffness of the floatably supporting member 18 in the axial direction is proportional to the thickness of the floatably supporting member 18. Therefore, the thickness D of the floatably supporting member is designed so that the floatably supporting member 18 has a sufficient stiffness required for stable thrust force transmission. Further, the stiffness of the floatably supporting member 18 can be adjusted to a required value by changing the thickness of the hinge springs 21 and 22 in directions parallel to the directions X and Y, respectively, and the radial of the arc of each extending portion of the slots 19 and 20.

The screw-nut feed mechanism according to the present invention can be applied to feed mechanisms of grinding machines as well as small amount moving mechanisms of high-accurate machining apparatus and the like.

Obviously, numerous modifications and variations of the present invention are possible in light of the above teachings. It is therefore to be understood that within the scope of the appended claims, the present invention may be practiced otherwise than as specifically described herein.

What is claimed is:

1. A screw-nut feed mechanism for effecting displacement of a movable table on a guiding base or bed in accordance with rotation of a feed screw shaft mounted on the guiding base, comprising:

a ball nut assembly threadedly coupled with said feed screw shaft; and a floatably supporting member for floatably supporting said ball nut assembly on said movable table in such a manner that said ball nut assembly is movable in a plane perpendicular to the rotational axis of said feed screw shaft and for restricting rotation of said ball nut assembly caused by rotation of said feed screw shaft, wherein said floatably supporting member is composed of a board extending in said plane and having a predetermined thickness in a direction parallel to the axis of said feed screw shaft and is formed with plural slots penetrating said floatably supporting member in a direction parallel to the axis of said feed screw shaft so as to form a fixed portion to be secured to said movable table, a first floating portion, first flexible connecting portions which integrate said first floating portion with said fixed portion and support said first floating portion for movement relative to said fixed portion in a first direction perpendicular to the axis of said feed screw shaft, a second floating portion, and second flexible connecting portions which integrate said first and second floating portions and support said second floating portion for movement relative to said first floating portion in a second direction perpendicular to the axis of said feed screw shaft and said first direction, and said ball nut assembly is secured to said second floating portion of said floatably supporting member.

2. A screw-nut feed mechanism as claimed in claim 1, wherein said first floating portion has a rectangular flamelike shape, said first flexible connecting portions are formed at four corners of said first floating portion between said fixed portion and said first floating portion, said second floating portion has a rectangular shape and formed within said first floating portion, and said second flexible connecting portions are formed at four corners of said second floating portion between said first floating portion and said second floating portion.

3. A screw-nut feed mechanism as claimed in claim 2, wherein each of said first flexible connecting portions is composed of a pair of flexible hinges which are aligned in said second direction, and each of said second flexible connecting portions is composed of a pair of flexible hinges which are aligned in said first direction.

* * * * *

UNITED STATES PATENT AND TRADEMARK OFFICE
CERTIFICATE OF CORRECTION

PATENT NO. : 5,140,863

DATED : August 25, 1992

INVENTOR(S) : Yasuo Niino et al.

It is certified that error appears in the above-identified patent and that said Letters Patent is hereby corrected as shown below:

On Title Page:

Item [75], the second inventor's name is spelled incorrectly, should be, --Tetsuro Shibukawa--.

Signed and Sealed this

Twenty-first Day of September, 1993

Attest:

BRUCE LEHMAN

*Attesting Officer*    *Commissioner of Patents and Trademarks*